May 18, 1937. L. R. HEIM 2,080,609
BEARING CONSTRUCTION
Original Filed Jan. 2, 1931   2 Sheets-Sheet 1

Lewis R. Heim
INVENTOR
BY
ATTORNEYS

May 18, 1937.  L. R. HEIM  2,080,609
BEARING CONSTRUCTION
Original Filed Jan. 2, 1931   2 Sheets-Sheet 2

Lewis R. Heim
INVENTOR

BY Janney, Blair & Curtis
ATTORNEYS

Patented May 18, 1937

2,080,609

UNITED STATES PATENT OFFICE 2,080,609

BEARING CONSTRUCTION

Lewis R. Heim, Mount Dora, Fla.

Application January 2, 1931, Serial No. 506,053
Renewed May 2, 1934

14 Claims. (Cl. 308—212)

This invention relates to bearing construction.

One of the objects of this invention is to provide a bearing construction which will be simple and thoroughly practical. Another object is to provide parts of a bearing of the above described character which will dependably retain rolls in bearings with a minimum amount of friction. Other objects are to provide a device of the above character of dependable and efficient operation, of ready and economical manufacture, and of ready assembly with a minimum risk of creating defective bearings through careless workmanship or any other cause. Another object is to provide a device of the above character which may be constructed with comparatively cheap and inexpensive materials. Another object is to provide a method of constructing bearings of the above character which will be simple, practical and readily practised under all conditions. Another object is to provide an art for making a bearing of the above character which will necessitate a minimum amount of labor and mechanical facilities and which may be carried on with rapidity to result in a consistently uniform construction. Other objects will be in part obvious and in part pointed out hereinafter.

This invention accordingly consists in the features of construction, combinations of elements, arrangements of parts and in the several steps and relation and order of each of the same to one or more of the others, all as will be illustratively described herein and the scope of the application of which will be indicated in the following claims.

In the accompanying drawings in which certain steps of my method are generally indicated, and in which is shown one or more of the various possible embodiments of the mechanical features of my invention, Figure 1 is an end elevation of a bearing, certain of the parts being in section.

Similar reference characters refer to similar parts throughout the several views of the drawings.

Figure 2:
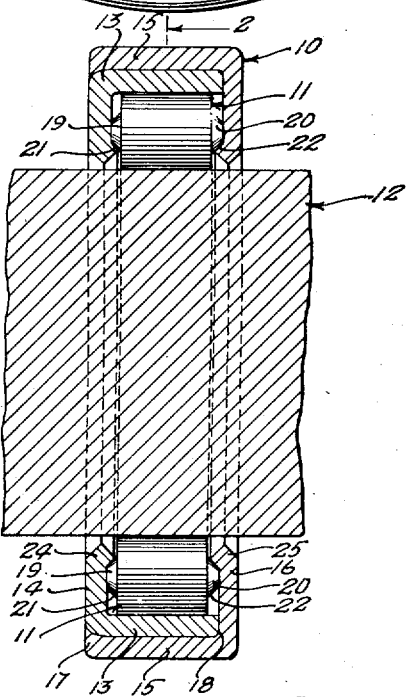
Figure 2 is a cross section taken along the line 2—2 of Figure 1.

Referring now to the drawings in detail there is shown in Figure 2 a roller bearing consisting of an outer race generally indicated at 10, rolls generally indicated at 11; the whole mounted on a shaft of any desired construction generally indicated at 12.

Embracing the periphery of a shell 13 provided with a flange 14 is a second cylindrical shell 15 having an inwardly extending flange 16. The inner diameter of shell 15 is slightly smaller than the periphery of shell 13, thus forming a close fit therewith. A lip 17 on the inner surface of shell 15 embraces the outer portion of flange 14 to interlock the two shells.

Flanges 14 and 16 are so arranged with respect to each other that they form the opposite end walls of race 10 and the end 18 of shell 13 substantially engages the inner surface of flange 16. In this manner the inner surface of shell 13 forms a surface for the race and flanges 14 and 16 extend inwardly for an equal distance; more specifically flange 16 is equal to the length of flange 14 plus the thickness of shell 13.

By this construction I am enabled to form an outer race for a bearing which because of its simple construction may be easily assembled and manufactured with cheap and inexpensive materials.

Extending from the opposite ends of rolls 11 are projections 19 and 20 respectively. These projections have bevelled surfaces 21 and 22 respectively and the distance from the outer end of projection 20 to the outer end of projection 19 is slightly less than the distance between the opposing inner surfaces of flanges 14 and 16. Lateral displacement of the rolls 11 which are disposed about the race is prevented by flanges 14 and 16. To prevent any radial displacement before the bearing unit is mounted on an inner race or on shaft 12 the ends 24 and 25 of flanges 14 and 16 respectively extend inwardly over bevelled surfaces 21 and 22 of projections 19 and 20. The ends of the flanges do not form a close fit with the projections of the rolls, sufficient play being left between them to allow for free rotation of the rolls at all times.

Thus these two cylindrical shells together with their respective flanges, which prevent any lateral or radial displacement of the rolls 11, form a complete bearing unit well adapted to withstand the usual wear and tear of operation and because of simple construction well adapted for versatile installation. It will be seen that upon assembly of the parts thus far described this bearing forms a complete unit which may be shipped as such from the manufacturer and eliminates the necessity of assembly by the user. Furthermore, because this bearing may be shipped as a complete unit the possibility of loss of essential parts while in transportation is also eliminated, and as the bearing may be so simply assembled the changes of quick deterioration because of defective assembly are reduced to a minimum.

Figure 3:
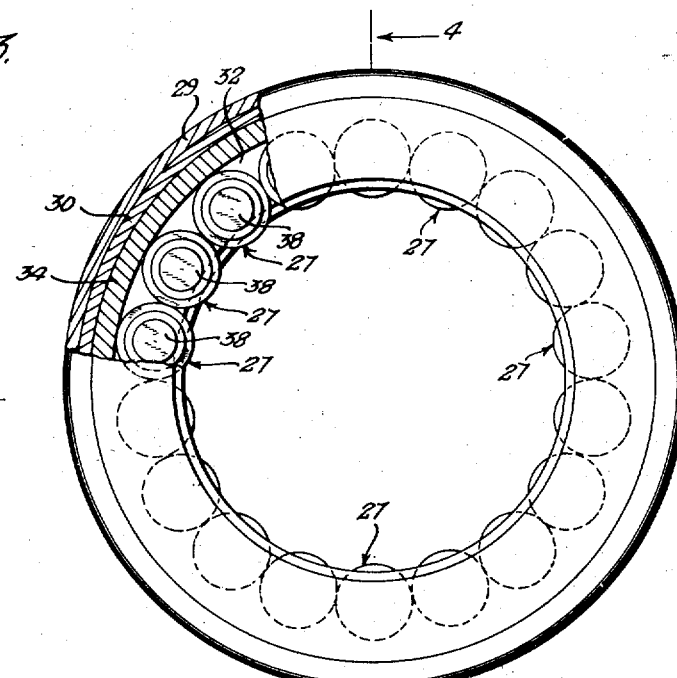
Figure 3 is an end elevation, partially in section, of another embodiment of certain features of my invention.
Figure 4:
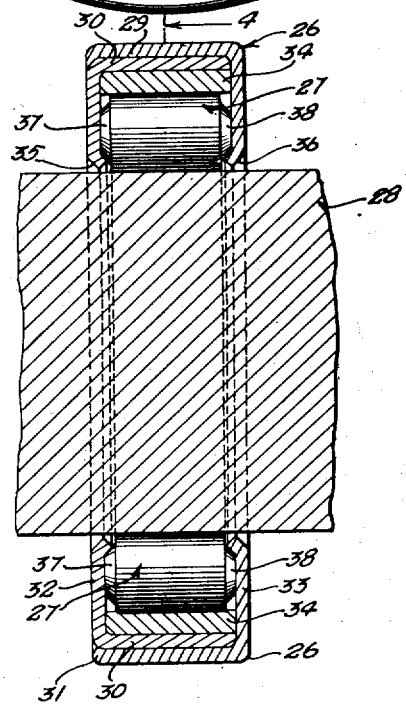
Figure 4 is a cross section of the bearing shown in Figure 3 taken along the line 4—4 of Figure 3.

Under certain conditions these bearings may be subjected to extremely hard usage as in heavy duty machinery. For this use and other uses I provide another embodiment of certain features of my invention as shown in Figures 3 and 4. Under certain conditions some friction may be created from the contact of the rolls with the floor of the race and it may be more desirable to provide a floor for the race better adapted to withstand this condition. Thus in Figure 4 there is shown a race generally indicated at 26 disposed about which are rolls generally indicated at 27, the whole being mounted in any desired manner such as on a shaft 28. A cylindrical shell 29 embraces a cylindrical shell 30 to form a close fit therewith, the two being interlocked to form a unit by a lip 31 on the inner surface of shell 29 extending about one end of shell 30. Shells 29 and 30 have inwardly extending flanges 32 and 33 substantially similar in construction to those described with reference to the embodiment of my invention shown in Figures 1 and 2. Thus shells 29 and 30 form a race for bearings in themselves but to insure a durable and accurate floor for this race I provide a cylindrical shell 34 disposed between flanges 32 and 33 and forming a close fit with the inner surface of shell 30. This shell is preferably formed from a suitable steel, heat treated and ground, thus giving a rigid race of finished and hardened inner surface.

As in the first-described embodiment of my invention radial displacement of rolls 27 is prevented by the inwardly extending ends 35 and 36 of flanges 32 and 33 respectively engaging the bevelled surfaces of projections 37 and 38 of the rolls. In this manner I provide a bearing unit which combines advantageous features of the former embodiment of my invention together with certain peculiar features which make this bearing more valuable under certain conditions.

Figure 1:
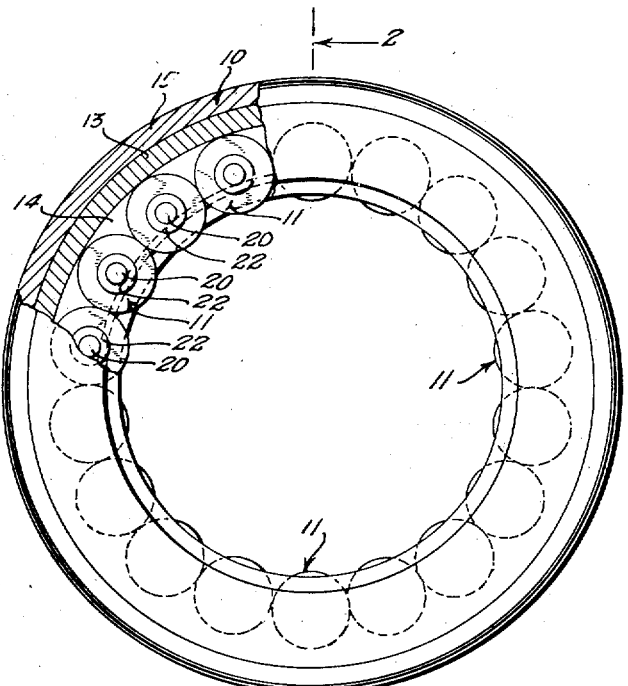

It will be understood that this bearing as well as that shown in Figures 1 and 2 of the drawings might be constructed to form an inner bearing without changing the general construction thereof. In this case the respective flanges of the cylindrical shells would extend outwardly instead of inwardly, the outer surfaces of the rolls forming the periphery of the bearing, this construction, of course, not departing from the broad scope of my invention.

The embodiment of my invention shown in Figures 1 and 2 may be made as follows:—First an inwardly extending flange 16 is formed on a cylindrical shell as by employing automatics and next a flange is formed on a second cylindrical shell in a similar manner; the periphery of this second shell being larger than the inner surface of the first shell. Then the ends of the respective flanges are crimped inwardly or if these flanges have been formed on an automatic these inwardly projecting ends may be formed simultaneously. Next rolls are formed having bevelled projections extending from their opposite ends and these rolls are disposed about the inner surface of the second cylindrical shell. Now the first cylindrical shell is forced over the periphery of the second cylindrical shell to form a close fit therewith and so that the respective ends of the flanges extend over the bevelled surfaces of the projections on the rolls. The bearing unit is now complete but the two shells forming the race may be interlocked by forming a lip on the inner surface of the first shell to extend about the edge of the flange on the second shell by crimping with suitable dies or this may be formed merely by the degree of endwise pressure applied thereto. As described above, this bearing is now complete and may be readily handled or shipped without danger of any of the parts becoming displaced. Furthermore, the materials used in the construction thereof are inexpensive, thus reducing the total cost of manufacture and by such a simple method of manufacture the cost of labor may be reduced to further reduce the total cost of the bearing. In this manner a thoroughly practical and simple method is provided and a bearing unit of durable materials is constructed.

A convenient method for constructing the bearing shown in Figures 3 and 4 of the drawings is to form the two flanged cylindrical shells in a manner similar to that employed in constructing the preferred embodiment of my invention. The cylindrical ring 34 constructed of resistant material is now formed on an automatic so that its periphery is larger than the inner surface of the shell 30. The ring 34 is now forced within the inner surface of shell 30, which is of softer metal, to form a close fit therewith. Next the rolls are formed with the bevelled projections extending from their opposite ends and are then disposed about the inner surface of the heat resistant shell. Now the shell 29 having a smaller diameter than the periphery of shell 30 is forced over this periphery to form a close fit therewith and so that the inwardly extending projections of the respective flanges extend over the bevelled ends of the rolls. To interlock the respective shells against possibility of lateral displacement a lip 39 on shell 29 may be crimped or drawn over the bottom of flange 32. It will be seen that this construction has many advantages, one of them being its extreme durability so that it may amply withstand heavy duty operation.

It will thus be seen that there is provided a construction and method of an essentially practical nature in which the several objects of this invention are attained.

As many other embodiments of the mechanical features of this invention may be made without departing from the scope thereof and as the art herein described may be varied it is to be understood that all matter herein set forth or shown in the accompanying drawings is to be interpreted as illustrative and not in a limiting sense.

I claim:

1. In bearing construction, in combination, a race including a pair of cylindrical shells telescopically fitted together so that one edge portion of the outer shell overlaps the corresponding edge portion of the inner shell to form an interlock, and radial flanges extending inwardly to form the opposite sides of said race, each flange being integral with one of said shells; and a plurality of rolls disposed in said race.

2. In bearing construction, in combination, a race including a pair of cylindrical shells telescopically fitted together so that one edge portion of the outer shell overlaps the corresponding edge portion of the inner shell to form an interlock, and radial flanges extending inwardly to form the opposite sides of said race, each flange being integral with one of said shells; and a plurality of rolls disposed in said race, the inner portions of said flanges extending inwardly toward each other to retain said rolls against radial displacement.

3. In bearing construction, in combination, a race including a pair of cylindrical shells telescopically fitted together so that one edge portion of the outer shell overlaps the corresponding edge portion of the inner shell to form an interlock, and radial flanges extending inwardly to form the opposite sides of said race, each flange being integral with one of said shells, and a series of rolls having reduced ends disposed within said race, said flanges extending inwardly over said reduced ends to retain said rolls against radial displacement.

4. In bearing construction, in combination, a race including a pair of cylindrical shells telescopically fitted together so that one edge portion of the outer shell overlaps the corresponding edge portion of the inner shell to form an interlock, radial flanges extending inwardly to form the opposite sides of said race, each flange being integral with one of said shells, and a cylindrical member fitted within the innermost of said shells and between said flanges; and a plurality of rolling members resting on said cylindrical member and between said flanges.

5. In bearing construction, in combination, a race including a pair of cylindrical shells telescopically fitted together so that one edge portion of the outer shell overlaps the corresponding edge portion of the inner shell to form an interlock, radial flanges extending inwardly to form the opposite sides of said race, each flange being integral with one of said shells, and a cylindrical member resting against one of said shells and disposed between said flanges; and a plurality of rolls disposed in said race, the inner portions of said flanges extending inwardly toward each other to retain said rolls against radial displacement.

6. In bearing construction, in combination, a race including a pair of sheet metal cylindrical shells telescopically fitted together so that one edge portion of the outer shell overlaps the corresponding edge portion of the inner shell to form an interlock, said shells having radial flanges extending inwardly to form the opposite sides of said race, and a plurality of rolls disposed in said race.

7. In bearing construction, in combination, a race including a pair of stamped metallic cylindrical shells, said shells being telescopically related and held in assembled relation by a force fit, the outer shell completely enclosing the inner shell, a flange portion extending from one end of each of said shells whereby the free end of said inner shell abuts the interior side of the flange portion extending from said outer shell and the free end of said outer shell lies in the plane of the exterior side of the flange portion extending from said inner shell, and a plurality of rolling members disposed in said race, said flange portions including portions bent axially toward one another and contacting portions of said rolling members to retain said rolling members against radial displacement, the axes of said rolling members being substantially equal to the distance between said flange portions.

8. In bearing construction, in combination, a cylinder, a flanged cylindrical shell disposed about said cylinder and related thereto by a force fit, one end of said cylinder abutting said flange and the other end of said cylinder lying in the plane of the free end of said shell, a second flanged shell disposed about said first-mentioned shell and related thereto by a force fit, the flange of said second-mentioned shell abutting the free end of said first-mentioned shell and the free end of said second-mentioned shell lying in the plane of the flange portion of said first-mentioned shell, a plurality of rolls disposed about said cylinder and means for maintaining said rolls in operative relation to said race.

9. In bearing construction, in combination, a race including a pair of substantially L-shaped metallic cylindrical shells telescopically force fitted one within the other, the free end of the outer shell lying in the peripheral portion of the outer shell lying in the plane of the exterior surface of the radially extending portion of the inner shell and the radially extending portions of both shells being bent to form axially extending portions, and a plurality of rolling members disposed within said race, said rolling members having beveled projections registering with said axially extending portions whereby said rolling members are maintained against radial displacement.

10. In bearing construction, in combination, a race of sheet metal having a continuous inner tracking surface, said race including a stamped sheet metal cylindrical member forming said tracking surface, a series of rolls disposed about the inner bearing surface of said cylindrical member and adapted to track thereon, said rolls having reduced ends, and a pair of flanges integrally formed with said race and bent inwardly therefrom over the opposite ends of said rolls to prevent axial displacement thereof, said flanges having their ends turned inwardly toward each other to engage under the reduced ends of said rolls whereby said rolls are retained against radial displacement.

11. In bearing construction, in combination, a race including a pair of telescopically fitted cylindrical shells and a cylindrical member fitting within said shells, whereby said race has a continuous tracking surface, a plurality of rolls disposed about said race, and means associated with said shells to retain said rolls against axial displacement.

12. In bearing construction, in combination, a race of sheet metal having an inner tracking surface continuous axially and circumferentially, the outer periphery of said race also being continuous axially and circumferentially, said race including a stamped sheet metal cylindrical member forming said tracking surface, a series of rolls disposed about the inner bearing surface of said cylindrical member and adapted to track thereon, said rolls having their axes parallel to one another and to the axis of said race, said rolls being unseparated and immediately adjacent one another and having their ends reduced, and a pair of flanges integrally formed with said race and bent inwardly therefrom over the opposite ends of said rolls to prevent axial displacement thereof, said flanges having their ends bent inwardly toward each other to engage under and contact portions of the reduced ends of the rolls to retain the rolls against radial displacement.

13. In bearing construction, in combination, a race of sheet metal having a continuous inner tracking surface, said race including a stamped sheet metal cylindrical member forming said tracking surface, a series of rolls disposed about the inner bearing surface of said cylindrical member and adapted to track thereon, said rolls having reduced ends, and a pair of flanges integrally formed with said race and bent inwardly therefrom over the opposite ends of said rolls to prevent axial displacement thereof, said flanges having their ends turned inwardly toward each other to engage under the reduced ends of said rolls, whereby said rolls are retained against radial displacement, the edge of each roll opposite the edge thereof engaging said tracking surface being closer to the axis of said race than the innermost edges of said flanges.

14. In bearing construction, in combination, a race of sheet metal having an inner tracking surface continuous axially and circumferentially, the outer periphery of said race also being continuous axially and circumferentially, said race including a stamped sheet metal cylindrical member forming said tracking surface, a series of rolls disposed about the inner bearing surface of said cylindrical member and adapted to track thereon, said rolls having their axes parallel to one another and to the axis of said race, said rolls being unseparated and immediately adjacent one another and having their ends reduced, and a pair of flanges integrally formed with said race and bent inwardly therefrom over the opposite ends of said rolls to prevent axial displacement thereof, said flanges having their ends turned inwardly toward each other to engage under the reduced ends of said rolls whereby said rolls are retained against radial displacement, the edge of each roll opposite the edge thereof engaging said tracking surface being closer to the axis of said race than the innermost edges of said flanges.

LEWIS R. HEIM.

DISCLAIMER 2,080,609.—*Lewis R. Heim*, Mount Dora, Fla. BEARING CONSTRUCTION. Patent dated May 18, 1937. Disclaimer filed September 3, 1943, by the inventor.
Hereby enters this disclaimer to claims 10, 12, 13, and 14 in said patent.
[*Official Gazette September 28, 1943.*]

the inner bearing surface of said cylindrical member and adapted to track thereon, said rolls having reduced ends, and a pair of flanges integrally formed with said race and bent inwardly therefrom over the opposite ends of said rolls to prevent axial displacement thereof, said flanges having their ends turned inwardly toward each other to engage under the reduced ends of said rolls, whereby said rolls are retained against radial displacement, the edge of each roll opposite the edge thereof engaging said tracking surface being closer to the axis of said race than the innermost edges of said flanges.

14. In bearing construction, in combination, a race of sheet metal having an inner tracking surface continuous axially and circumferentially, the outer periphery of said race also being continuous axially and circumferentially, said race including a stamped sheet metal cylindrical member forming said tracking surface, a series of rolls disposed about the inner bearing surface of said cylindrical member and adapted to track thereon, said rolls having their axes parallel to one another and to the axis of said race, said rolls being unseparated and immediately adjacent one another and having their ends reduced, and a pair of flanges integrally formed with said race and bent inwardly therefrom over the opposite ends of said rolls to prevent axial displacement thereof, said flanges having their ends turned inwardly toward each other to engage under the reduced ends of said rolls whereby said rolls are retained against radial displacement, the edge of each roll opposite the edge thereof engaging said tracking surface being closer to the axis of said race than the innermost edges of said flanges.

LEWIS R. HEIM.

DISCLAIMER 2,080,609.—*Lewis R. Heim*, Mount Dora, Fla. BEARING CONSTRUCTION. Patent dated May 18, 1937. Disclaimer filed September 3, 1943, by the inventor.
Hereby enters this disclaimer to claims 10, 12, 13, and 14 in said patent.
[*Official Gazette September 28, 1943.*]

DISCLAIMER 2,080,609.—*Lewis R. Heim*, Mount Dora, Fla. BEARING CONSTRUCTION. Patent dated May 18, 1937. Disclaimer filed September 3, 1943, by the inventor.
Hereby enters this disclaimer to claims 10, 12, 13, and 14 in said patent.
[*Official Gazette September 28, 1943.*]